(12) United States Patent
Susanta et al.

(10) Patent No.: US 8,892,728 B2
(45) Date of Patent: Nov. 18, 2014

(54) AUTOMATIC ZONE-BASED MANAGEMENT OF A DATA CENTER

(75) Inventors: Adhikary Susanta, Bangalore Karnataka (IN); Shivakumar Bhavna, Bangalore Karnataka (IN); V. Prashanth, Bangalore Karnataka (IN); Misra Bharat, Bangalore Karnataka (IN); Vanish Talwar, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 13/187,962

(22) Filed: Jul. 21, 2011

(65) Prior Publication Data

US 2013/0024559 A1    Jan. 24, 2013

(51) Int. Cl.
*G06F 15/173* (2006.01)
*G06F 15/16* (2006.01)
*G06F 9/50* (2006.01)

(52) U.S. Cl.
CPC ............ *G06F 9/5061* (2013.01); *G06F 9/5083* (2013.01)
USPC .......................................... 709/224; 709/230

(58) Field of Classification Search
USPC ........................................................ 709/224
See application file for complete search history.

(56) References Cited

U.S. PATENT DOCUMENTS

| 7,702,931 | B2 | 4/2010 | Goodrum et al. | |
|---|---|---|---|---|
| 2005/0165925 | A1* | 7/2005 | Dan et al. | 709/224 |
| 2009/0210528 | A1* | 8/2009 | Swildens et al. | 709/224 |
| 2009/0327489 | A1* | 12/2009 | Swildens et al. | 709/224 |
| 2010/0268755 | A1 | 10/2010 | Arimilli et al. | |
| 2010/0312891 | A1 | 12/2010 | Pairault et al. | |

FOREIGN PATENT DOCUMENTS

CN    101807985 A    8/2010
WO    WO-2010072085 A1    7/2010

* cited by examiner

*Primary Examiner* — Emmanuel L Moise
*Assistant Examiner* — Mahran Abu Roumi

(57) ABSTRACT

Automatic zone-based management of a data center. Nodes are assigned to a first zone. One of the nodes is selected as zone leader. A load ratio of the zone leader is monitored, nodes are identified for shedding if the load ratio exceeds a predetermined maximum, and the identified nodes are assigned to a new zone. One of the nodes in the new zone is selected as zone leader. The load ratio of each zone leader is monitored, nodes are identified for shedding if the load ratio exceeds a predetermined maximum, and the identified nodes are assigned to an additional new zone, the zone leaders negotiate for reassignment of loads.

19 Claims, 7 Drawing Sheets

AUTOMATIC ZONE-BASED MANAGEMENT OF A DATA CENTER

BACKGROUND

A data center typically houses a plurality of appliances such as servers, computers, processors, routers, switches, and other electronic devices. Such a center may support one large user, such as a nationwide bank, or many users, each of which may need only one or a few appliances to support its business. The continued expansion of the use of computers and the Internet has led to construction and use of more and more data centers, each of which may house hundreds of appliances. As the number of appliances in a data center has increased, and each appliance has become more complex, effective management of these appliances has become a critical factor in the successful operation of the data center.

DETAILED DESCRIPTION

The invention is described by reference to exemplary embodiments. Details are used to give an understanding of these embodiments, but the invention may be practiced without limitation to these details. Also, some known methods and structures have not been described in detail in order to avoid obscuring the invention. The invention is limited only by the claims.

Figure 1:
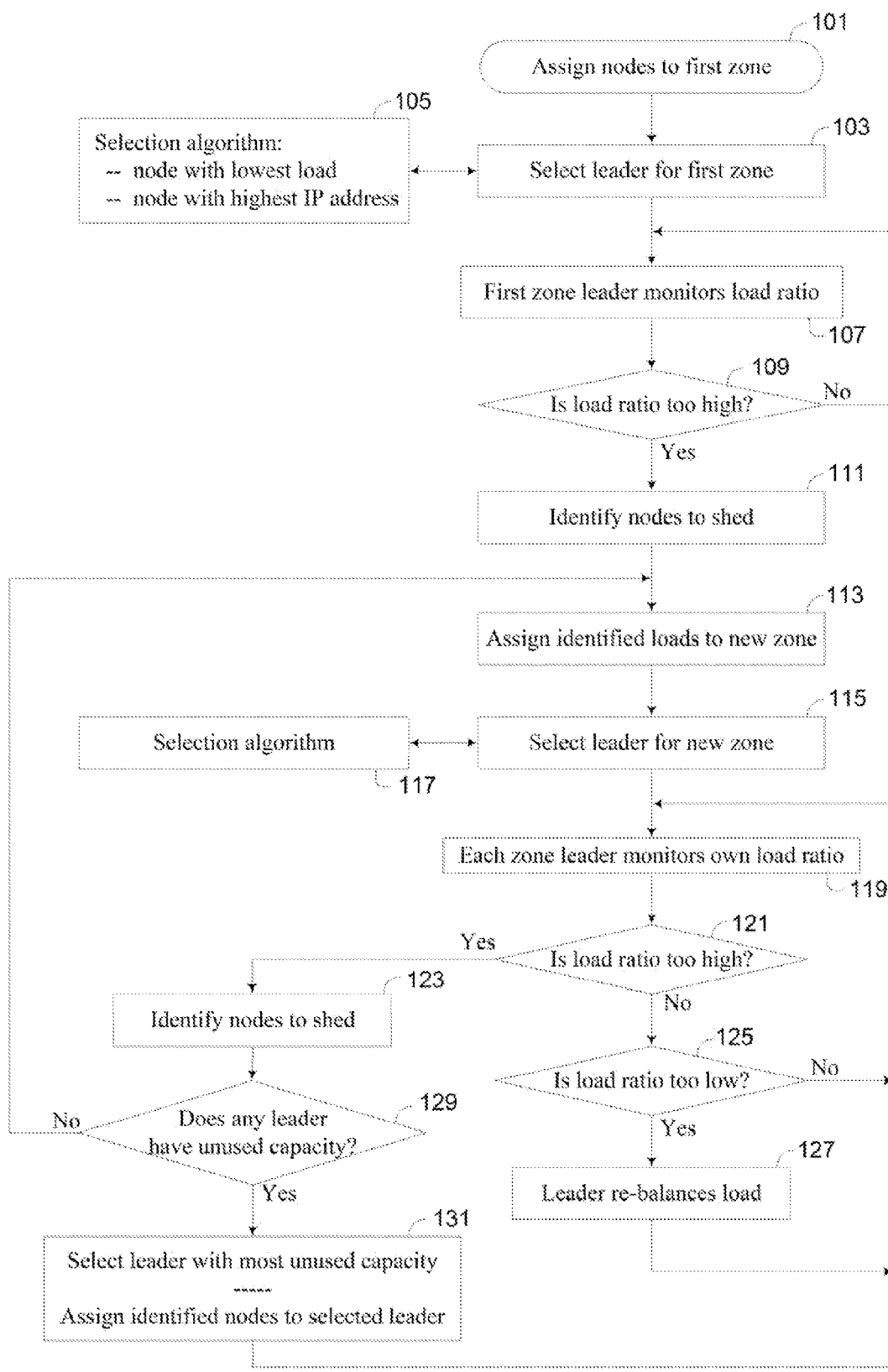
FIG. 1 is a flow chart illustrating an embodiment of the invention.

There has been a need for a way to automatically manage appliances in a data center. FIG. 1 illustrates a method of automatically managing a data center according to an embodiment. A plurality of nodes each including an appliance are assigned to a first zone (101). One of the nodes is selected as leader of the first zone (103) according to a predetermined algorithm (105). The selection is carried out by one or more of the nodes.

The load ratio of the zone leader is monitored (107). If the load ratio exceeds a predetermined maximum (109) nodes are identified for shedding (111) and are assigned to a new zone (113). The zone leader itself may perform these tasks.

One of the identified nodes is selected (115) as leader of the new zone according to a predetermined algorithm (117). The selection is carried out by one or more of the identified nodes.

The algorithm used for selecting a zone leader (105, 117) may include selecting a node having a higher numerical IP address than any other node, or selecting a node having a lower load than any other node. The algorithm may be specified by a user, for example by being incorporated into a server within a node The same algorithm may used to select the leader of the first zone (105) and the leader of a subsequently-created zone (117), but this is not essential, and in some embodiments different algorithms may be used to select leaders of different zones.

The load ratio of each zone leader is monitored (119). If the load ratio exceeds a predetermined maximum (121), nodes to shed are identified (123) and assigned to an additional new zone (113). Each zone leader may perform these tasks as respects its own zone.

One of the nodes in the additional new zone is selected as leader (115) according to a predetermined algorithm (117), the selection being carried out by one or more of the nodes in the additional new zone. The originating zone may retain its leader, or after the loads have been shed the remaining nodes in the originating zone may select a new leader.

A zone may comprise a logical set of one or more appliances. For example, a zone may be a set of computers in physically adjacent equipment racks. These computers may be associated with a single network switch, and they may also include front-end and back-end computers. A zone may be a set of appliances spanning multiple racks running a service, or a zone may be determined based on a set of servers in a cloud. An application, for example a customer's web application, may run on many computers spanning more than one zone. Request schedulers of web applications may run on front-end machines in a data center, and database servers may run on back-end machines in the data center in a different zone. A zone may delineate data center subsystems or multiple physical data centers located in a single public or private cloud.

Some or all of the appliances may comprise monitoring brokers. These brokers may be deployed in isolated management virtual machines, or in management processors such as an "iLO" management processor from Hewlett-Packard Company (the assignee of this application), or in management blades such as blades from Hewlett-Packard Company. The monitoring brokers may perform correlation, aggregation, and analysis functions, for example to detect anomalous behavior. The monitoring brokers may aggregate and analyze data collected by other appliances such as data collectors.

Examples of data that may be collected by data collectors are metrics including current state or current load of the network system; latency; throughput; bandwidth; system, CPU, or memory utilization; power consumption; or temperature.

Monitor and data collection operations may be contained as a utility, program, or subprogram in any desired storage medium and executed in an appliance. These operations may exist in program instructions as source code, object code, executable code, or in other formats. They may be stored in computer-readable storage devices such as random access or read-only memories, magnetic media, or the like.

In some embodiments, if the load ratio of the leader of any zone falls below a predetermined minimum (125) the loads of the zone leaders are balanced (127). This may be done by a higher-level zone leader reassigning nodes from a zone having a higher load ratio to the zone having the load ratio below the predetermined minimum, or it may be done by negotiation among some or all of the zone leaders.

If the load ratio of the leader of any zone exceeds the predetermined maximum (123), before creating a new zone and assigning the identified nodes to that new zone, it may be determined whether any zone leader has unused capacity (129). In some embodiments this determination is made by a higher-level zone leader. The higher-level zone leader may select one or more other zone leaders having unused capacity, or if more than one zone leader has unused capacity, the zone of that zone leader having the most unused capacity may be selected and the identified nodes assigned to the selected zone (131). In other embodiments, if the load ratio of any zone leader exceeds the predetermined maximum, some or all of the zone leaders at the same level or at different levels may negotiate for reassignment of loads to any zone leader having capacity to accept more loads.

How much load ratio is "too high" (109, 121) may be determined by whether the load ratio exceeds a predetermined amount. In some embodiments this amount is fixed at a numerical value. In one embodiment a value of 30% has been found to give good results. In other embodiments the predetermined value may be calculated by the zone leader according to such factors as the number and difficulty of the various loads, the amount computation time being consumed by the lead node, or other means for assessing the demands made by the various loads on the zone leader.

As load ratio drops, so does efficiency. The "too low" threshold (125) may be set at any convenient point according to the desired level of efficiency.

Identifying loads to shed (111, 121) may involve selecting enough loads according to workload imposed by each load to lower the load ratio to less than the predetermined maximum. For example, if a zone leader has 40 nodes and two of them are generating most of the workload, those two might be identified. Or, identifying loads to shed may be done by selecting a fraction of the total number of load. The fraction may be determined in advance, for example as one-half of the loads. Or the fraction may be computed according to the actual load ratio. For example, if the load ratio is 40% and the maximum has been defined as 30%, one-fourth-of the load should be shed, and this may be done by identifying one-fourth of the loads, for assignment to the new zone.

Typically, the plurality of nodes assigned to the first zone comprises all the nodes in the data center. But in some embodiments it may be desired to assign less than all of them to the first zone so that some nodes could be managed separately.

More broadly, in some embodiments the number of loads that can, be managed by a leader is determined according to the leader's optimal load. If it is managing a greater number of nodes than its optimal load, the excess nodes should be transferred either to another leader or to a new zone with a new leader. Similarly, when a leader has fewer nodes than it is capable of managing, it can ask its leader to transfer more nodes to it, possibly shrinking the number of zones or even the number of levels in the hierarchy.

The optimal load on each leader may be determined by an entropy-based algorithm that calculates the optimal number of servers that can be managed by the leader.

By using the principles of the invention, a large data center can dynamically manage itself as new nodes are added. A data center with one hierarchical level expands itself to two levels as the number of nodes increases, eliminating any need for manual reconfiguration. Initially, a single leader is selected for all the nodes, as described above. The number of nodes the leader can manage may be determined by the performance of the leader. If the load ratio is too high, the zone is split. The "load ratio" is expressed as the ratio of the maximum number of loads the leader can manage to the actual number of loads the leader is managing. The excess nodes may be transferred to other zones with lower load ratios or may be formed into a new zone as determined by the leader. If the leader is unable to form another zone or to transfer the excess nodes, it may request the leader above it to do so. Ultimately, if no leader can find or create a zone, the top-level leader would create a new level for the excess nodes.

Figure 2:
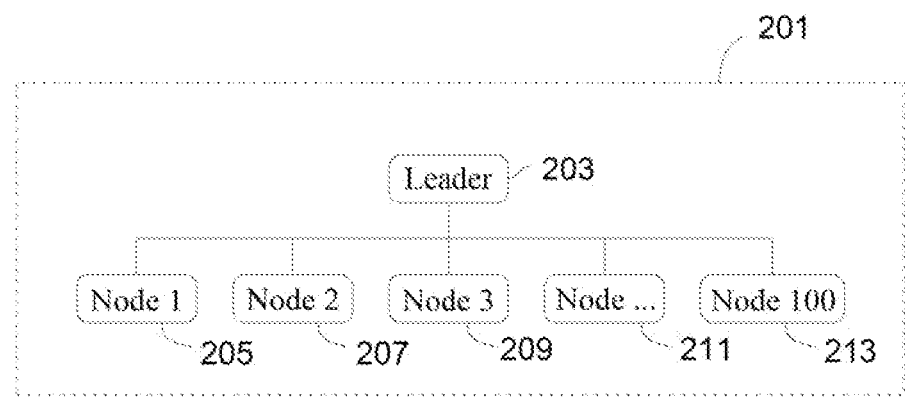
FIG. 2 is a schematic of a data center with nodes arranged in a first zone.

FIG. 2 illustrates a data center in which there is only one zone 201. The zone 201 has a leader 203 and under it a first node 205, a second node 207, a third node 209, fourth through 99th nodes 211, and a one-hundredth node 213.

One hundred nodes may be too many for the leader to manage effectively. For example, it may be determined that the leader can manage only 40 nodes effectively. Accordingly, sixty of the nodes are identified as excess and are assigned to a second zone. When a leader of the second zone is selected, it is determined that this leader also can handle only 40 nodes. Accordingly, twenty of its nodes are identified as excess and are assigned to a third zone.

Figure 3:
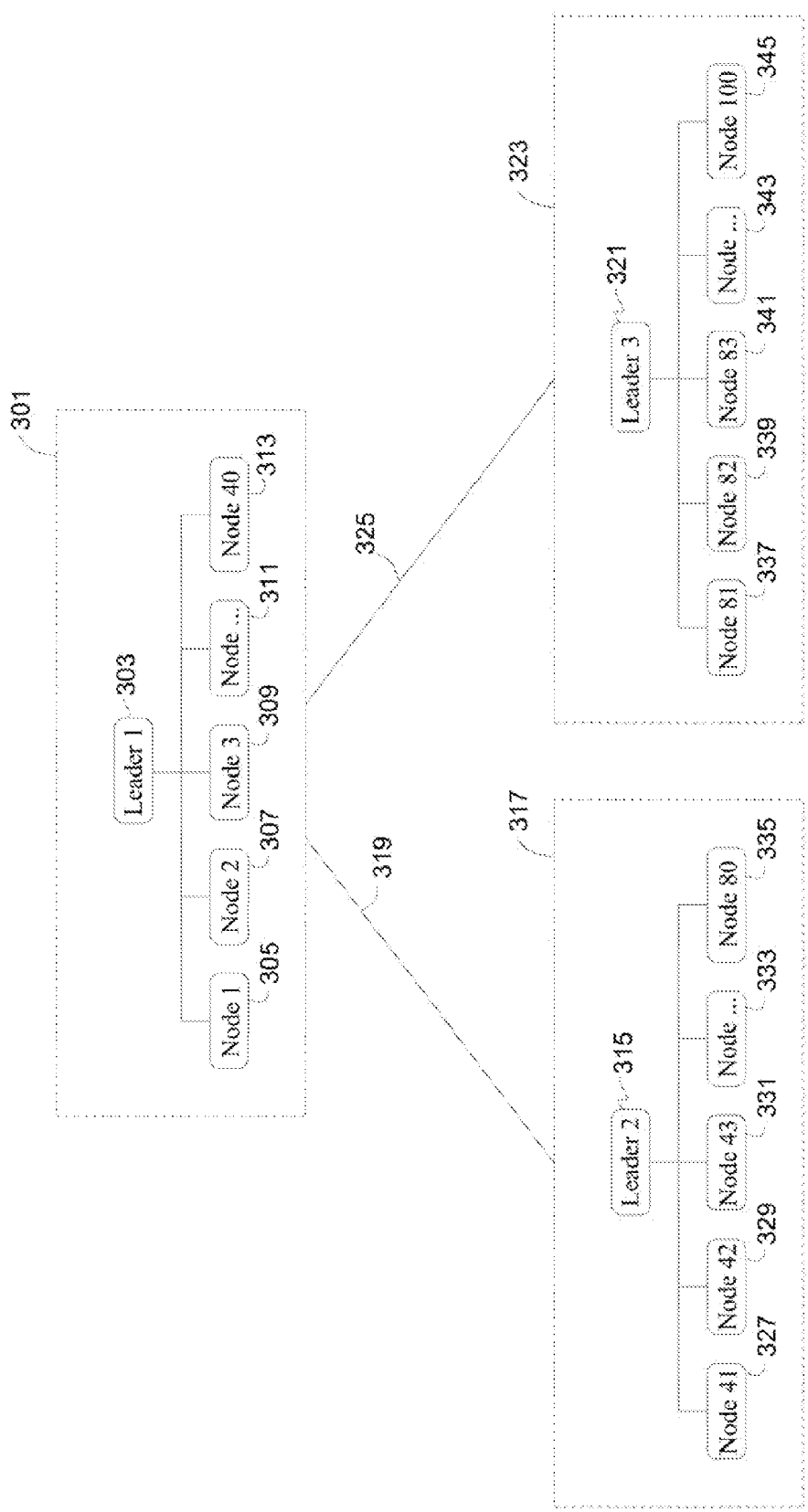
FIG. 3 is a schematic of the data center of FIG. 2, with some of the nodes moved into a second zone and others into a third zone.

The resulting situation is illustrated in FIG. 3. The first zone 301 is similar to the first zone 201 in FIG. 2, except that the leader 303 of this zone now has only 40 nodes 305, 307, 309, 311 and 313 to manage. In addition the leader 303 is also leader of a leader 315 of a second zone 317 as indicated by a connection 319, and of a leader 321 of a third zone 323 as indicated by a connection 325. The second zone 317 includes 40 nodes 327, 329, 331, 333 and 335, and the third zone includes 20 nodes 337, 339, 341, 343 and 345.

Figure 4:
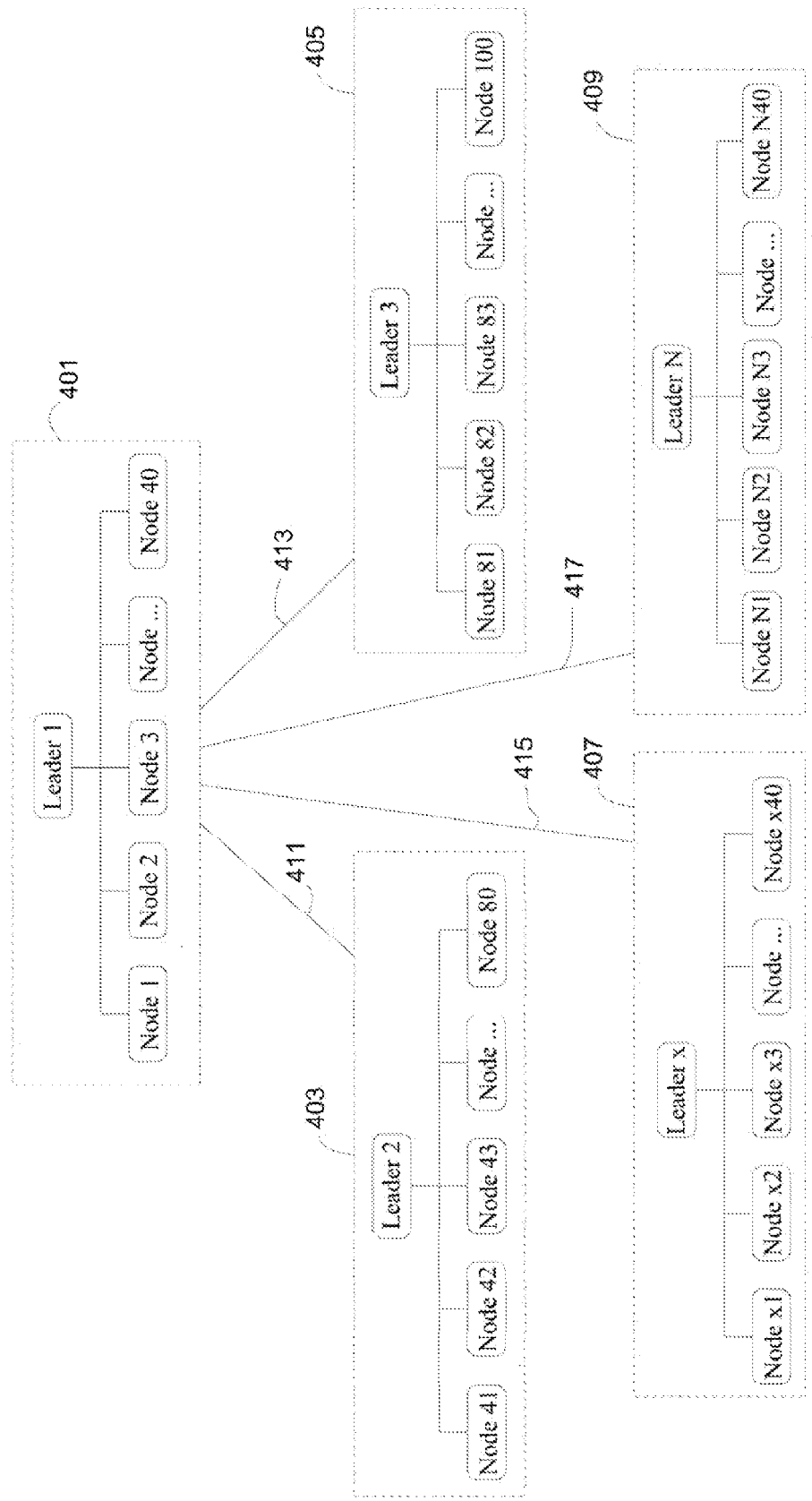
FIG. 4 is a schematic of the data center of FIG. 3, with additional nodes arranged in a fourth zone and more additional nodes arranged in a fifth zone.

As shown in FIG. 4, over time more zones are added until the first zone 401 (similar to the first zone 301 of FIG. 3) now has four other zones 403, 405, 407 and 409 under it, as indicated by connections 411, 413, 415 and 417, respectively. The zone 403 is similar to the zone 317 and the zone 405 is similar to the zone 323. The zone 407 has a leader and nodes x1 through x40, and the zone 409 has a leader and nodes N1 through N40.

Figure 5:
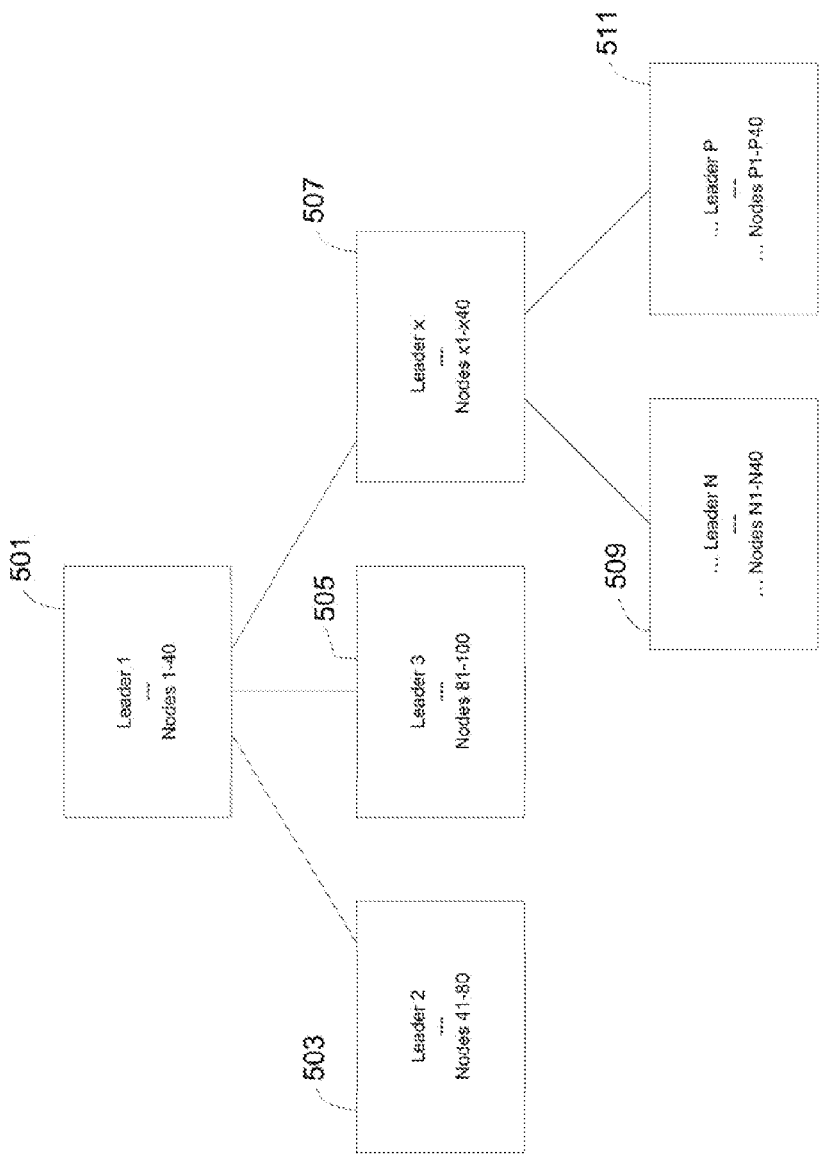
FIG. 5 is a schematic of the data center of FIG. 2, with additional nodes arranged in a fourth zone and more additional nodes arranged hierarchically below the fourth zone into fifth and sixth zones.

Another configuration is shown in FIG. 5. This configuration has a first zone 501, a second zone 503, and a third zone 505, similar to the zones 301, 313 and 323, respectively, as shown in FIG. 3. In addition, a fourth zone 507 (nodes x1 to x40) is under the first zone 501 and in turn has two zones 509 (nodes N1 to N40) and 511 (nodes P1 to P40) under it.

Figure 6:
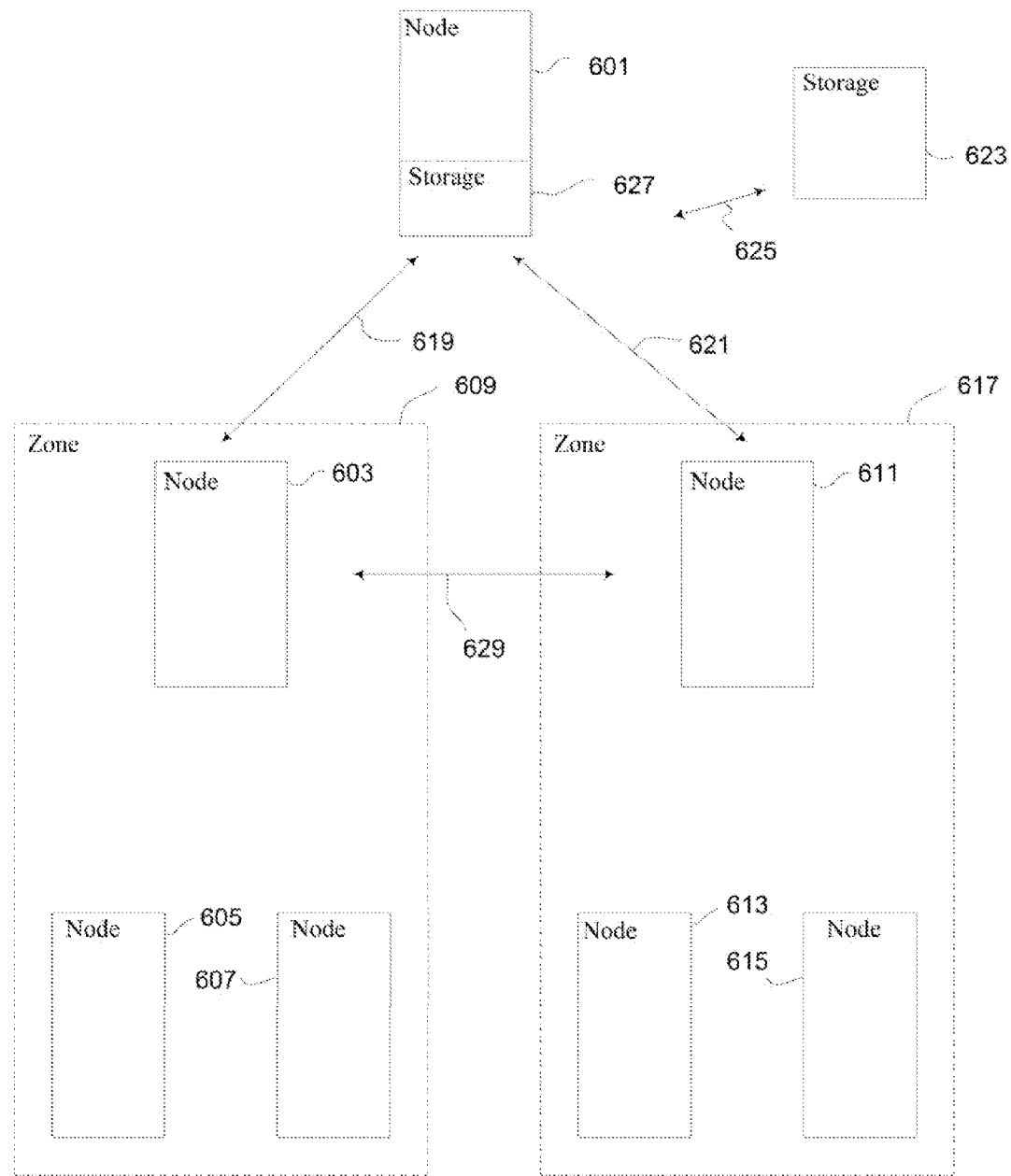
FIG. 6 is a block diagram of a data center with a plurality of nodes arranged into zones.

FIG. 6 shows a data center that has been divided into zones according to principles of the invention. The center includes a plurality of appliances, such as servers, each forming a node. For example, a server forms a node 601 with overall management responsibility for the data center. This server may include the Hewlett-Packard Central Management System (CMS) or other management software.

Other electronic appliances in the center form nodes that have been arranged into zones. In particular, nodes 603, 605 and 607 have been arranged into a first zone 609. The node 603 has been selected as zone leader. Similarly, nodes 611, 613 and 615 have been arranged into a second zone 617, and the node 611 has been selected as zone leader.

A communication channel interconnects the nodes. This is represented symbolically as an arrow 619 between the node 601 and the node 603, and an arrow 621 between the node 601 and the node 611. The communication channel also interconnects the other, nodes.

A data storage unit is included in the data center. This may take the form of a separate storage unit 623, shown communicating with the various nodes by an arrow 625. The data storage unit may be implemented by data storage within any or all of the servers, for example a data storage unit 627 within the server in the node 601.

If a zone leader has too high a load ratio, either as determined by the zone leader itself or by a supervisory zone leader; some or all of the zone leaders may negotiate a redistribution of the loads. This is indicated symbolically by an arrow 629 between the zone leaders 603 and 611.

Some or all of the servers may include management software, for example the Hewlett-Packard Integrated Lights Out (iLO) product.

Figure 7:
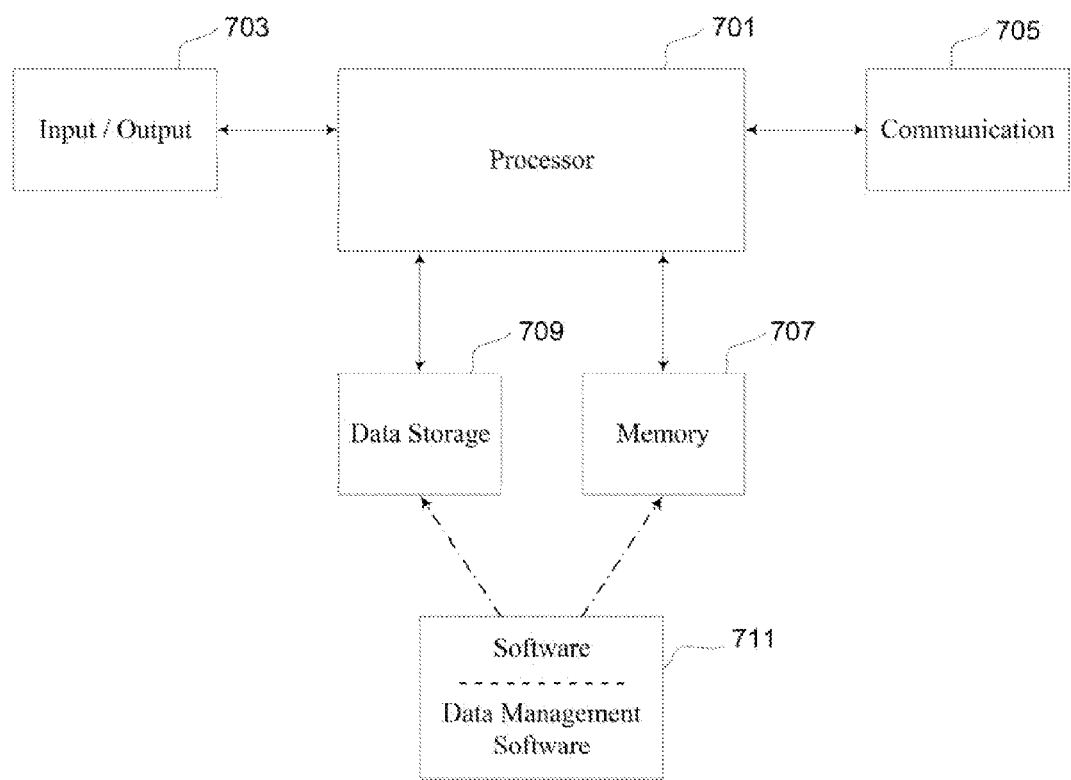
FIG. 7 is a block diagram of a typical appliance that may serve as a node.

An example of an appliance is shown in block diagram form in FIG. 7. A processor 701, which may be styled as a microprocessor, a central processing unit (CPU), or the like, performs processing functions and communicates with various devices. One or more input/output devices 703, for example keyboards, visual displays, mice or other pointing devices, may be used by a user to communicate with the appliance. The processor may communicate with remote users or with other appliances either local or at a distance through a communications device 705. The communication device 705 may comprise an ethernet connection, a modem, any suitable port, a direct-wired connection, and appropriate communication software. A memory 707 may comprise one or more dynamic or static read-write or read-only elements or other local data storage devices that serve as cache memory or main memory. A data storage unit 709 may comprise magnetic, optical, or other storage media. Software, including for example an operating system and data management software, may be stored in the memory or in the data storage unit and called by the processor as needed, or the software may be remotely stored and accessed through the communication device. The data management software includes various algorithms and procedures as described above for managing a data center according to the principles of the invention.

Embodiments of the invention find an application in managing data centers. Management may be distributed but deployed as a computation graph in the data center. The computation graph is built using zone division as described above to distribute the load on a first zone leader. The computation graph is elastic and reconfigurable based on loads in the various zones.

A logical view of the data center would consist of a single zone with an elected leader using a leader election algorithm as described above. The leader would then decide to expand or shrink the computation graph and re-form zones, also as described above. The monitoring brokers at physical nodes would perform two functions. One function would be to apply aggregation and analysis functions on the local monitoring data streams and raise alerts of anomalous behavior when detected. This would ensure that local policies are applied as close as possible to the source of the monitoring data. The other function would be to send raw local data streams along the computation graph to the zone leader for zone-level aggregation.

If the zone level aggregation completion time exceeds an acceptable threshold, the zone leader asks for a reconfiguration of the computation graph within the zone. The leader switches the interconnections between itself and the monitoring brokers from a centralized configuration to either a multi-hierarchy topology or a peer-to-peer topology or a combination of the two. Analysis—that is, anomaly detection—is not affected because the nodes always know who the leader is, regardless of the state of any reconfiguration. When the aggregation for a polling interval finally completes at, the zone leader (whether centralized, hierarchical, or peer-to-peer), the leader applies a policy on the aggregated data and also makes that data available for inter-zone aggregation and analysis. The process of aggregating data across zones is similar to that within a zone except that it occurs among zone-level leaders. Similar reconfiguration of the computation graph can take place across zone leaders based on system load.

Certain embodiments have been described and illustrated. However, the invention is not to be limited by these descriptions and illustrations but only by the following claims.

What is claimed is:

1. A method of automatically managing a data center, the method comprising:
   A. assigning a plurality of nodes to a first zone, each node including an appliance;
   B. selecting one of the nodes as leader of the first zone according to a predetermined algorithm, the selection being carried out by one or more of the nodes;
   C. monitoring, by the zone leader, a load ratio of the zone leader, identifying, by the zone leader, nodes to shed if the load ratio exceeds a predetermined maximum, and assigning, by the zone leader, the identified nodes to a new zone;
   D. selecting one of the identified nodes as leader of the new zone according to a predetermined algorithm, the selection being carried out by one or more of the identified nodes;
   E. monitoring a load ratio of each zone leader, identifying nodes to shed if the load ratio exceeds a predetermined maximum, and assigning the identified nodes to an additional new zone; and
   F. selecting one of the nodes in the additional new zone as leader according to a predetermined algorithm, the selection being carried out by one or more of the nodes in the additional new zone.

2. The method of claim 1 and further comprising, if the load ratio of the leader of any zone falls below a predetermined minimum, balancing the loads of the zone leaders.

3. The method of claim 2 wherein balancing the loads of the zone leaders comprises reassigning, by a higher level zone leader, nodes from a zone leader having a higher load ratio to the zone leader having the load ratio below the predetermined minimum.

4. The method of claim 1 and further comprising, if the load ratio of the leader of any zone exceeds the predetermined maximum, before assigning the identified nodes to another new zone, determining, by a higher level zone leader, whether any zone leader has unused capacity and if so, selecting that zone leader having the most unused capacity and assigning the identified nodes to the selected zone leader.

5. The method of claim 1 and further comprising, if any zone leader determines that it has a load ratio exceeding the predetermined maximum, negotiating among two or more of the zone leaders to reassign loads to zone leaders having capacity to accept more loads.

6. The method of claim 1 wherein the same predetermined algorithm is used each time a zone leader is to be selected at any level.

7. The method of claim 1 wherein the predetermined algorithm comprises selecting a node having one of a lower load than any other node and a higher numerical IP address than any other node.

8. The method of claim 1 wherein the predetermined value of the load ratio of at least one of the zone leaders is thirty percent.

9. The method of claim 1 wherein identifying loads to shed comprises selecting enough loads according to workload imposed by each load to lower the load ratio to less than the predetermined maximum.

10. The method of claim 1 wherein identifying loads to shed comprises selecting a fraction of the total number of loads.

11. The method of claim 10 wherein the fraction comprises a predetermined number.

12. The method of claim 10 wherein the fraction is determined according to the load ratio.

13. The method of claim 1 wherein the plurality of nodes comprises all the nodes in the data center.

14. A data center comprising:
a plurality of appliances each forming a node;
a communication channel between the appliances;
a data storage unit; and
computer instructions in the data storage unit operative:
to cause the appliances to select a first zone leader according to a predetermined algorithm;
to cause the first zone leader to monitor its own load ratio, to identify nodes to shed if the load ratio exceeds a predetermined maximum, and to assign the identified nodes to a second zone;
to cause the identified nodes to select a second zone leader according to a predetermined algorithm; and
to cause the second zone leader to monitor its own load ratio, to identify nodes to shed if the load ratio exceeds a predetermined maximum, and to assign the identified nodes to a third zone.

15. The data center of claim 14 wherein the data storage unit comprises digital memory distributed among a plurality of the appliances.

16. The data center of claim 14 wherein the data storage unit comprises a central digital memory in communication with the appliances.

17. The data center of claim 14 and further comprising computer instructions in the data storage unit operative if the load ratio of any zone leader falls below a predetermined minimum to cause the zone leaders to balance their loads by reassigning nodes from a zone having a higher load ratio to the zone having the load ratio below the predetermined minimum.

18. The data center of claim 14 and further comprising computer instructions in the data storage unit operative to cause two or more of the zone leaders to negotiate a reassignment of loads to one or more zone leaders having capacity to accept more loads if the load ratio of the leader of any zone exceeds the predetermined maximum.

19. The data center of claim 14 and further comprising computer instructions in the data storage unit operative to cause a higher-level zone leader to create a new zone at a lower hierarchical level and to reassign loads to the new zone if the load ratio of the leader of any zone exceeds the predetermined maximum.

* * * * *